United States Patent [19]

Kinoshita

[11] E Re. 28,512

[45] Reissued Aug. 12, 1975

[54] RECIPROCATING PISTON TYPE ENGINES HAVING WEIGHTS FOR BALANCING PRIMARY INERTIAL FORCES

[75] Inventor: Haruo Kinoshita, Hamamatsu, Japan

[73] Assignee: Yamaha Hatsudoki Kabushiki Haisha, Hamakita, Japan

[22] Filed: Aug. 1, 1974

[21] Appl. No.: 493,849

Related U.S. Patent Documents

Reissue of:

[64] Patent No.: 3,744,342
Issued: July 10, 1973
Appl. No.: 184,113
Filed: Sept. 27, 1971

[30] Foreign Application Priority Data

Oct. 2, 1970 Japan ..... 45-98096

[52] U.S. Cl. ..... 74/604; 123/192 B
[51] Int. Cl.[2] ..... F16F 15/26
[58] Field of Search ..... 74/603, 604; 123/192 B, 123/188 C, 197 AC

[56] References Cited

UNITED STATES PATENTS

| | | | |
|---|---|---|---|
| 1,163,832 | 12/1915 | Lanchester | 123/192 B |
| 2,271,766 | 2/1942 | Huebotter | 74/604 |
| 2,807,249 | 9/1957 | Peras | 123/192 B |
| 3,626,786 | 12/1971 | Kinoshita et al. | 74/604 |

*Primary Examiner*—Samuel Scott
*Assistant Examiner*—F. D. Shoemaker

[57] ABSTRACT

A reciprocating piston type internal combustion engine comprising a small gear rotatably mounted between one of crank arms and a connecting rod by means of a pivot provided on said one crank arm in the same phase as a crank-pin and projecting toward the connecting rod, an internal gear having a number of teeth twice that of said small gear and fixedly mounted on the inner wall of a crankcase in meshing engagement with said small gear, a rotating balance weight provided on said small gear in such a way that it is in its lower position when the crank-pin is in the top dead center, and a revolving balance weight provided on the crank arms on the side opposite to the crank-pin with respect to crank journals.

7 Claims, 6 Drawing Figures

INVENTOR
HARUO KINOSHITA
BY John Lezdey
ATTORNEY

INVENTOR
HARUO KINOSHITA
BY John Lezdey
ATTORNEY

INVENTOR
HARUO KINOSHITA
BY John Hedley
ATTORNEY

INVENTOR
HARUO KINOSHITA
BY John Lezdey
ATTORNEY

RECIPROCATING PISTON TYPE ENGINES HAVING WEIGHTS FOR BALANCING PRIMARY INERTIAL FORCES

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to a reciprocating piston type internal combustion engine having a piston-crank mechanism in which primary inertia force can be perfectly balanced.

2. Description of the Prior Art

The applicant has already proposed in Patent Application Ser. No. 5,875, now U.S. Pat. No. 3,626,786, a piston-crank mechanism or a reciprocating piston type internal combustion engine in which a revolving balance weight is provided on the side opposite to a crank-pin of a crank arm fixed on a crank-journal and supporting the crank-pin, while a small gear having a rotating balance weight is coaxially mounted on the crank-pin, and said small gear is held in meshing engagement with an internal gear fixedly mounted in a crankcase and having a number of teeth twice that of said small gear and is connected to a piston by a connecting rod, whereby the forces of inertia caused by the reciprocating motion of the piston are substantially completely balanced to minimize vibrations. However, this type of piston-crank mechanis, because of a large number of component parts, becomes complicated in construction and large in size, and can hardly be put in practical use.

SUMMARY OF THE INVENTION

A primary object of the present invention is to improve the reciprocating piston type internal combustion engine of the type described above.

Another object of the invention is to obtain a highly practical construction of the reciprocating piston type internal combustion engine which is comprised of a minimum number of component parts and simple and can be easily produced with high productivity and at a lost cost.

DESCRIPTION OF THE PREFERRED EMBODIMENTS

Figure 1:
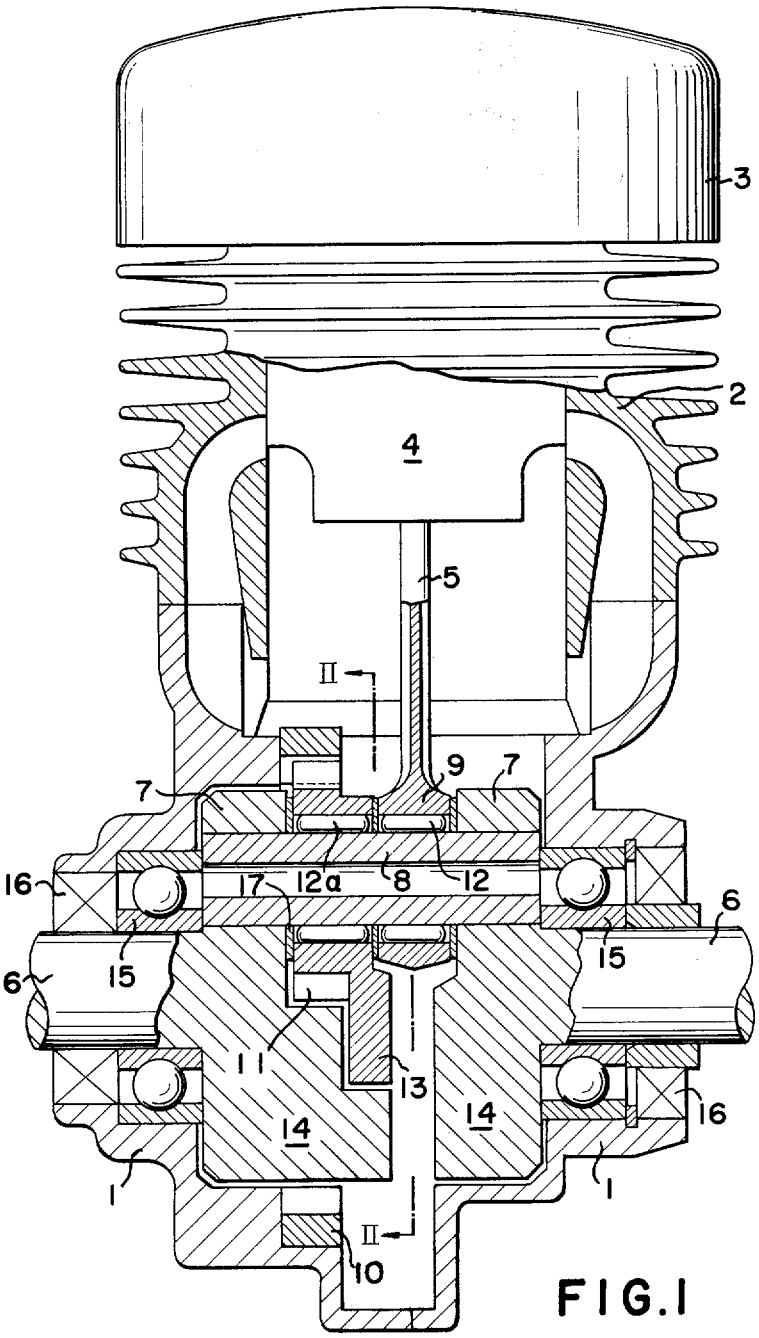
FIG. 1 is a vertical sectional view showing one embodiment of the present invention.

An embodiment of the invention will be described with reference to FIGS. 1 to 4. Referring first to FIG. 1, reference numeral 1 designates a crankcase, 2 a cylinder, 3 a cylinder head, 4 a piston which makes a reciprocating motion within the cylinder 2, 5 a connecting rod connected with the piston 4 and 6 crank journals. Crank arms 7 are formed on the crank journals 6 extending at right angles thereto and a crank-pin 8 is fixed to the crank arms 7 with the opposite ends thereof being force-fitted into said crank arms 7. The crank journals 6, crank arms 7 and crank-pin 8 constitute a crank-shaft. The crank-pin 8 rotatably supports the large diameter end 9 of the connecting rod 5.

In the present invention, an internal gear 10 is fixedly mounted in the crankcase 1 and a small gear 11 having a number of teeth one-half of that of said internal gear 10 and meshing with said internal gear 10 is rotatably mounted on the crank-pin 8 in side-by-side relation with the large diameter end 9 of the connecting rod 5. Reference numeral 12 designates a needle bearing interposed between the large diameter end 9 of the connecting rod 4 and the crank-pin 8, and 12a designates another needle bearing interposed between the small gear 11 and the crank-pin 8. The small gear 11 is formed with a rotating balance weight 13 on its side face facing the large diameter end 9 of the connecting rod 5 in such a way that said rotating balance weight will be in its downward position when the crank-pin 8 is in its upward position, while the crank arms 7 are formed with revolving balance weights 14 in opposite phase relation with the crank-pin 8. Reference numeral 15 designates ball bearing supporting the crank journals 6, 16 oil seals and 17 thrust washers.

In the reciprocating piston type internal combustion engine constructed as described above, when the piston 4 makes a reciprocating motion, the small gear 11 in meshing engagement with the internal gear 10 fixedly mounted on the inner wall of the crankcase 1 bodily revolves round the center line the crank journals 6 while rotating round its own axis. Since the large diameter end 9 of the connecting rod 5 is rotatably mounted on the crank-pin 8 coaxially with the small gear 11, the center of the crank-pin 8 moves incident to the reciprocating motion of the piston 4 along a circle having a radius l which is the length of the crank arms 7 (refer to FIG. 3).

Of all the masses connected to the crank-pin 8, with mA representing the reciprocating mass at the piston (the sum of the masses of the piston 4 and its accessories the reciprocating mass of the connecting rod 5, and the mass of a bearing at the small diameter end of the connecting rod), and mD representing the rotating mass (the sum of the rotating mass of the connecting rod and the mass of the bearing at the large diameter end of the connecting rod 5), mB representing the mass of the rotating balance weight 13 on the small gear 11 which is a rotating portion, and mC representing the mass of the revolving balance weights 14 on the crank arms 7 which are revolving portions, the primary forces of inertia of the largest absolute values $F_{DX}$, $F_{AY}$, $F_{BX}$, $F_{BY}$, $F_{CX}$, $F_{CY}$, $F_{DX}$ and $F_{DY}$ of all the lateral and vertical forces of inertia of these masses mA, mB, mC and mD are respectively represented by the following formulae, using the rotational angle $\theta$ of the crank arms as parameter:

$$F_{AX} = mA \cdot l(d\theta/dt)^2 \cos\theta + mA \cdot l(d^2\theta/dt^2) \sin\theta$$

$$F_{AY} = 0$$

$$F_{BX} = mB(1-R_B)\{(d\theta/dt)^2 \cos\theta + d^2\theta/dt^2 \sin\theta\}$$

$$F_{BY} = mB(1+R_B)\{(d\theta/dt)^2 \sin\theta - d^2\theta/dt^2 \cos\theta\}$$

$$F_{CX} = mC \cdot R_c\{-(d\theta/dt)^2 \cos\theta - d^2\theta/dt^2 \sin\theta\}$$

$F_{CY} = mC \cdot R_c \{-(d\theta/dt)^2 \sin\theta + d^2\theta/dt^2 \cos\theta\}$ $F_{DX} = mD \cdot l \{(d\theta/dt)^2 \cos\theta + d^2\theta/dt^2 \sin\theta\}$ $F_{DY} = mD \cdot l \{(d\theta/dt)^2 \sin\theta - d^2\theta/dt^2 \cos\theta\}$ wherein $R_B$ : the distance between the center of gravity of the rotating balance weight mB and the center line of the crank-pin 8

$R_C$ : the distance between the center of gravity of the revolving balance weight mC and the center line of the crank journals 6

Here, when the arrangement is made to satisfy the conditional equations $$mB \cdot R_B = l/2\ mA$$

$$mC \cdot R_C = mB \cdot + l/2\ mA + mD \cdot l$$

the following results will be obtained:

$$F_{AX} + F_{BX} + F_{CX} + D_{DX} = 0$$

$$F_{AY} + F_{BY} + D_{CY} + F_{DY} = 0$$

Figure 2:
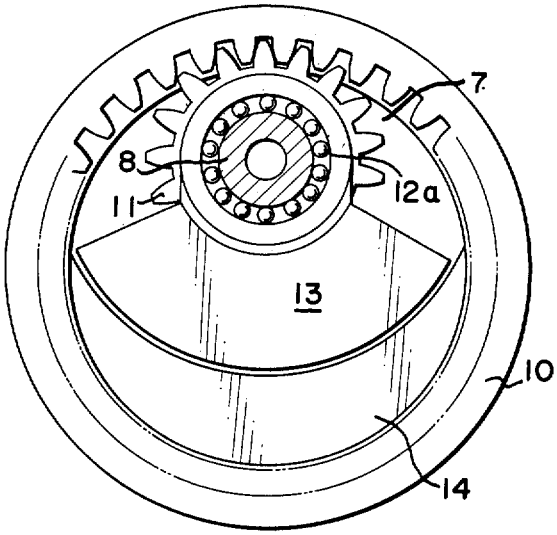
FIG. 2 is a transverse sectional view taken along the line II—II of FIG. 1.
Figure 3:
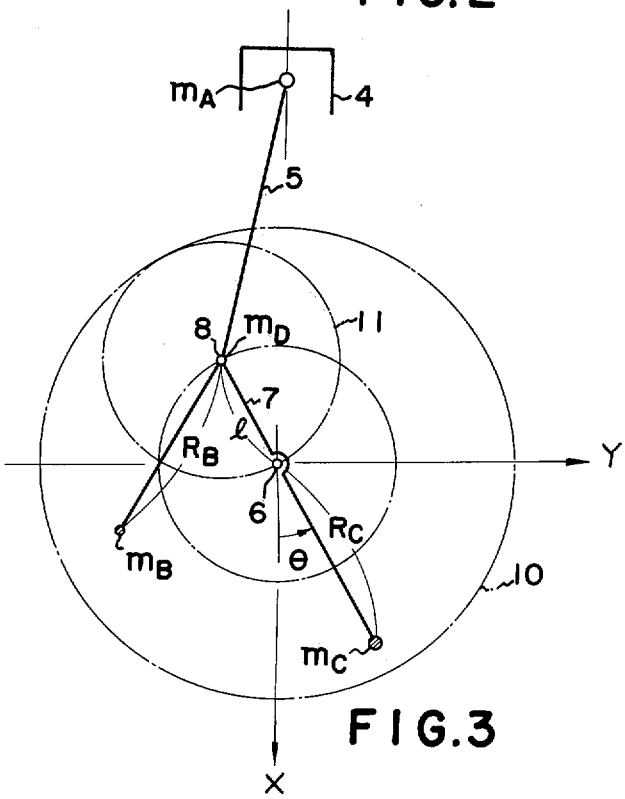
FIGS. 3 and 4 are diagrammatical views for explaining the operation of the embodiment shown in FIGS. 1 and 2.

Namely, in the construction shown in FIGS. 1 and 2 the primary forces of inertia can be completely balanced, provided that the above conditions are satisfied.

Figure 4:
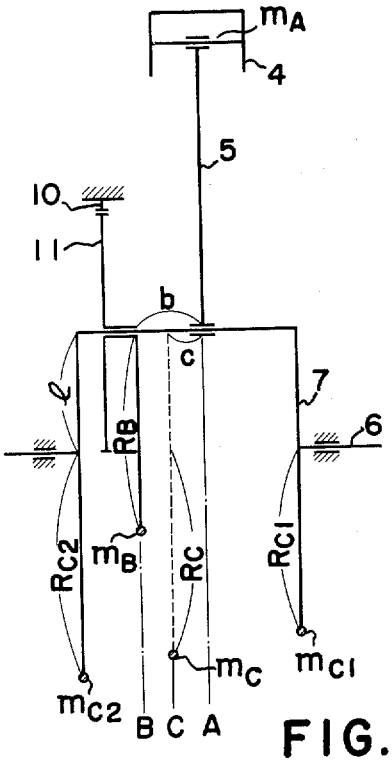

In the above embodiment, as may be apparent from FIGS. 1 and 4, the reciprocating mass mA and the rotating balance weight mass mB do not move in one plane. Therefore, a periodically varying unbalanced moment which makes the engine to rotate about a vertical axis and a horizontal axis perpendicular to the crank shaft will result. This unbalanced moment when represented by vector, varies according to the angular position of the crank-shaft in respect of its absolute value and phase. However, the maximum absolute value of this unbalanced moment becomes small when a plane of application C of the resultant force of the centrifugal forces created by the revolving balance weights $mC_1$ and $mC_2$ is located between the center line A of the piston 4 or an axis A along which the center of gravity of the reciprocating mass mA reciprocates and a plane of application B of the rotating balance weight mB as shown in FIG. 4, and becomes smallest especially when the following condition is satisfied:

$$c = l/1 + R_B \cdot b$$

where c : the distance between the line or axis A and the plane of application C b : the distance between the line or axis A and the plane of application B l : the distance between the center line of the crank-pin 8 and the center line of the crank journals 6

$R_B$ : the distance between the center of gravity of the rotating balance weight mB and the center line of the crank-pin 8

According to the present invention, as described above, the primary forces of inertia can be completely balanced and vibrations can be decreased to a practically acceptable degree. Further, since only one small gear 11 is mounted on the crank-pin 8 and the rotating balance weight 13 is provided only on the small gear 11, the number of component parts can be reduced to a minimum and the construction can be simplified. Furthermore, since the amount of eccentricity of the rotating balance weight 13 can be decreased by providing said rotating balance weight 13 on the side face of the small gear 11 facing the large diameter end 9 of the connecting rod, the unbalanced moment resulting from misalignment of the center of the engine and the center of gravity of the rotating balance weight 13 can be reduced in amount to a substantially negligible degree, and can be further reduced by shifting the revolving balance weight mC toward the rotating balance weight mB as stated above.

Still further, since the large diameter portion 9 of the connecting rod 5 and the small gear 11 are mounted on the crank-pin 8 in adjacent side-by-side relation so that they are rotatable independently of each other relative to said crank-pin, a torque is transmitted from the large diameter end 9 to the crank-shaft directly through the crank-pin 8 and does not act on the small gear 11. Therefore, the material of the small gear 11 is not required to be of high strength. For instance, the small gear 11 and the rotating balance weight 13 can be integrally molded of sintered alloys and the internal gear 10 can be molded of synthetic resins. Thus, these parts can be easily produced with high productivity and cooperate without generating noises.

The large diameter end 9 of the connecting rod 5 and the small gear 11 are rotatably mounted on the crank-pin 8 independently of each other, so that they can be readily mounted and demounted individually, rendering the assembly and disassembly of the mechanism easy. The small gear 11 rotates relative to the crank-shaft at a rate of speed twice as high as that of the latter, and hence the crank-pin 8 and the needle bearing 12a therefor undergo severe conditions. However, the needle bearing 12a can be lubricated in a manner similar to the large diameter end 9 of the connecting rod easily, without requiring any special lubricating system.

Figure 6:
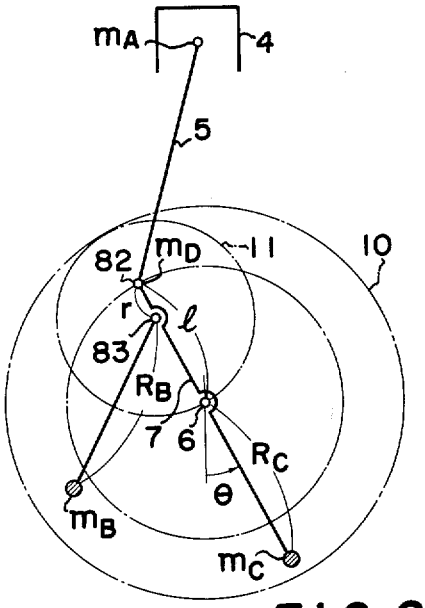
FIG. 6 is a diagrammatical view for explaining the operation of the embodiment shown in FIG. 5.
Figure 5:
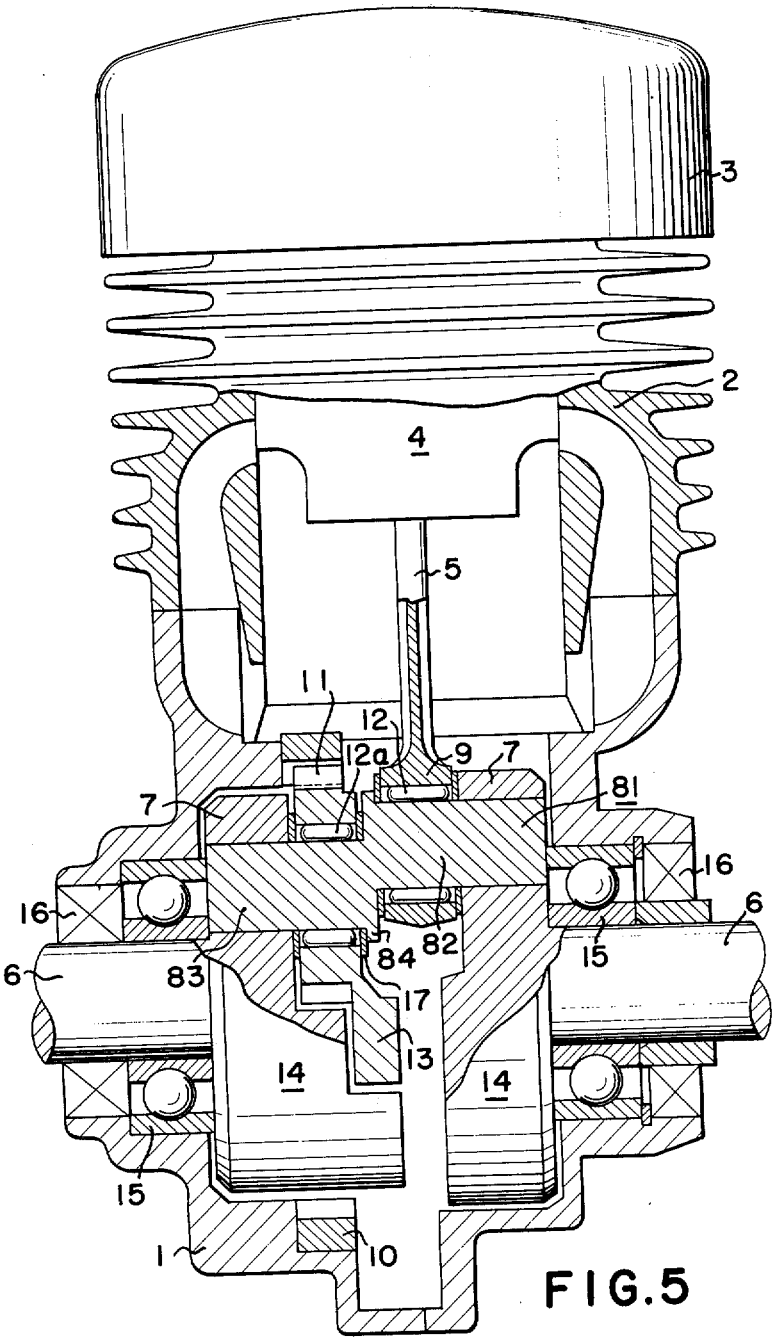
FIG. 5 is a vertical sectional view showing another embodiment of the invention.

In FIGS. 5 and 6 there is shown another embodiment of the invention. This embodiment is the same as the preceding embodiment, with only the exception that a crank-pin 81 has a different shape from that in the preceding embodiment. In FIGS. 5 and 6, same parts as those in the preceding embodiment are indicated by same numerals and the descriptions thereof are omitted.

The crank-pin 81 is not straight but cranked to provide an outer pivot 82 and an inner pivot 83 which are a distance r eccentric relative to each other. The outer pivot 82 is force-fitted into the right hand crank arm 7 and has the large diameter end 9 of the connecting rod rotatably mounted thereon. The inner pivot 83 is force-fitted into the left hand crank arm 7 in the same phase as the outer pivot 82 with respect to the crank-shaft but offset toward the crank journals 6 or inwardly relative to the outer pivot 82, and has the small gear 11 rotatably mounted thereon. A flange 84 is formed between the outer pivot 82 and the inner pivot 83 of the crank-pin 81 to hold the large diameter end 9 of the connecting rod 5 and the small gear 11 against lateral movement as well as to prevent a strength reduction of the crank-pin 81.

In this embodiment constructed as described above, when the piston 4 makes a reciprocating motion, the center of the large diameter end 9 of the connecting rod 5 or the center of the outer pivot 82 move along a circle of a radius l, i.e., the length of the crank arms 7, incident to the reciprocating motion (refer to FIG. 6). The small gear 11 rotates round its own axis in meshing engagement with the internal gear 10 while concurrently bodily revolving round the crank journal 6 together with the inner pivot 83.

It will be understood that in this embodiment also, similar to the preceding embodiment, the primary forces of inertia are completely balanced provided that the following conditions are satisfied: $mB \cdot R_B = l/2 \cdot mA$ $$mC \cdot R_C = mB(l - r) + l/2\ mA + mD \cdot l$$

The unbalanced moment which tends to cause the engine to rotate about a vertical axis and a horizontal axis perpendicular to the crank-shaft can be decreased in the similar manner as in the preceding embodiment.

In this embodiment, as stated above, the axis of the inner pivot 83 having the small gear 11 rotatably mounted thereon is offset toward the crank journal 6 relative to the outer pivot 82 having the large diameter end 9 of the connecting rod rotatably mounted thereon. Therefore, the diameter of the internal gear 10 can be made small relative to the piston stroke and the internal setup of the crankcase can be made compact. Consequently, the entire engine can be compact and small in size. Particularly in case of a crank chamber compression type two cycle engine, the internal space of the crankcase can be decreased, the preliminary compression efficiency can be enhanced and the engine output can be increased.

Furthermore, with reference to the revolving balance weight 14 provided on the crank arms 7 on the side opposite to the crank-pin 8, the weight thereof can be reduced since the small gear 11 having the rotating balance weight 13 is positioned relatively close to the axis of the crank-shaft.

Although the present invention has been described and illustrated herein in terms of specific embodiments thereof, it should be understood that the invention is not restricted to the details of the embodiments shown but many changes and modifications are possible within the scope of the appended claims.

I claim:

1. A reciprocating piston type internal combustion engine having a crankcase, a crank-shaft rotatably mounted in said crankcase and including crank journals, crank arms and a crank-pin, a piston and a connecting rod having the opposite ends thereof rotatably connected to said crank-pin and said piston respectively, said engine comprising a. a pivot provided on one of the crank arms in the same phase as and rigidly fixed to the crank-pin and protruding toward the connecting rod, b. a small gear rotatably mounted on said pivot between said one of the crank arms and the connecting rod, and being in side-by-side relation with the large diameter end of the connecting rod, c. an internal gear having a number of teeth twice that of said small gear and fixed to the crankcase in meshing engagement with said small gear, d. a rotating balance weight provided on said small gear adjacent to one side of the connecting rod in such a way that it will be in its lower position when the crank-pin is in the top dead center, and e. revolving balance weight provided on said crank arms on the side opposite to the crank-pin with respect to the crank journals.

2. A reciprocating piston type internal combustion engine according to claim 1, wherein said crank-pin and said pivot are an integral straight pin.

3. A reciprocating piston type internal combustion engine according to claim 1, wherein said crank-pin and said pivot respectively consist of an [inner] *outer* pivot and an [outer] *inner* pivot which are connected integrally with each other in the shape of a crank, and the inner pivot has the small gear rotatably mounted thereon, while the outer pivot has the large diameter end of the connecting rod rotatably mounted thereon, and further the inner pivot is located closer to the crank journals than the outer pivot.

4. A reciprocating piston type internal combustion engine according to claim 2, wherein $$mB \cdot R_B = l/2 \cdot mA$$

$$mC \cdot R_c = mB \cdot l + l/2 \cdot mA + mD \cdot l$$

wherein mA : the reciprocating mass added to the piston-pin
mB : the mass of the rotating balance weight
mC : the mass of the revolving balance weight
mD : the rotating mass added to the crank pin
l : the distance between the center line of the crank-pin and the center line of the crank journals
$R_B$ : the distance between the center of gravity of mB and the center line of the crank-pin
$R_C$ : the distance between the center of gravity of mC and the center line of the crank journals.

5. A reciprocating piston type internal combustion engine according to claim 3, wherein $$mB \cdot R_B = l/2 \cdot mA$$

$$mC \cdot R_C = mB \cdot (l - r) + l/2 \cdot mA + mD.$$

wherein mA, mB, mC, mD, 1, $R_B$ and $R_C$ have the meanings as defined in claim 4 and r is the distance between the center line of the inner pivot and the center line of the outer pivot.

6. A reciprocating piston type internal combustion engine according to claim 4, wherein $$C = l/l + R_B \cdot b$$

wherein

C : the distance between an axis along which the center of gravity of the reciprocating mass reciprocates and a plane of application of the resultant force of the centrifugal forces created by the revolving balance weight
b : the distance between an axis along which the center of gravity of the reciprocating mass reciprocates and a plane of application of the resultant force of the centrifugal forces created by the rotating balance weight
l : the distance between the center line of the crank-pin and the center line of the crank journals
$R_B$ : the distance between the center of gravity of the rotating balance weight and the center line of the crank-pin

*7. A reciprocating piston type internal combustion engine having a crankcase, a crank-shaft rotatably mounted in said crankcase and including crank journals, crank arms and a crank-pin, a piston and a connecting rod having the opposite ends thereof rotatably connected to said crank-pin and said piston respectively, said engine comprising*

*a. a pivot provided on one of the crank arms in the same phase as and rigidly fixed to the crank-pin and protruding toward the connecting rod,*

*b. a small gear rotatably mounted on said pivot and being in side-by-side relation with the large diameter end of the connecting rod,*

*c. an internal gear having a number of teeth twice that of said small gear and fixed to the crankcase in meshing engagement with said small gear,*

*d. a rotating balance weight provided on said small gear in such a way that it will be in its lower position when the crank-pin is in the top dead center, and*

*e. revolving balance weight provided on said crank arms on the side opposite to the crank-pin with respect to the crank journals.*

* * * * *